(12) United States Patent
Bhatt et al.

(10) Patent No.: US 8,520,589 B2
(45) Date of Patent: Aug. 27, 2013

(54) MOBILE DEVICE AND METHOD FOR INTELLIGENTLY COMMUNICATING DATA GENERATED THEREBY OVER SHORT-RANGE, UNLICENSED WIRELESS NETWORKS AND WIDE AREA WIRELESS NETWORKS

(75) Inventors: Yogesh Bhatt, Schaumburg, IL (US); Sanjay Gupta, Lakewood, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1076 days.

(21) Appl. No.: 12/154,009

(22) Filed: May 19, 2008

(65) Prior Publication Data
US 2009/0286531 A1      Nov. 19, 2009

(51) Int. Cl.
*H04W 4/00*          (2009.01)
(52) U.S. Cl.
USPC ........................................ 370/328; 455/435.1
(58) Field of Classification Search
USPC ................. 370/328, 329, 331, 338, 341, 349, 370/401; 455/349, 410, 413, 414.1, 422.1, 455/435, 435.1
See application file for complete search history.

(56) References Cited

U.S. PATENT DOCUMENTS

| | | | | |
|---|---|---|---|---|
| 6,925,074 | B1 * | 8/2005 | Vikberg et al. | 370/338 |
| 7,036,143 | B1 | 4/2006 | Leung et al. | |
| 7,280,826 | B2 * | 10/2007 | Nylander et al. | 455/433 |
| 7,496,344 | B2 | 2/2009 | Stadelmann et al. | |
| 7,512,094 | B1 * | 3/2009 | Linebarger et al. | 370/329 |
| 2004/0141507 | A1 | 7/2004 | Michel | |
| 2004/0203815 | A1 * | 10/2004 | Shoemake et al. | 455/450 |
| 2004/0240525 | A1 * | 12/2004 | Karabinis et al. | 375/132 |
| 2004/0259541 | A1 * | 12/2004 | Hicks et al. | 455/426.1 |

(Continued)

FOREIGN PATENT DOCUMENTS

| | | |
|---|---|---|
| EP | 2 071 775 A1 | 6/2009 |
| EP | 2071775 A | 6/2009 |
| WO | WO 2009/074767 A1 | 6/2009 |

OTHER PUBLICATIONS http://www.isaserver.org/tutorials/2004fixipsectunel.html?printversion; Remote Access VPN and a Twist on the Dangers of Split Tunneling; ISAserver.org; Web security and Web Filtering for ISA Server; pp. 1-7.

(Continued)

*Primary Examiner* — Michael Thier
*Assistant Examiner* — Prince A Mensah
(74) *Attorney, Agent, or Firm* — Daniel C. Crilly; Sylvia Chen

(57) ABSTRACT

A mobile device is provisionable for service on a wireless wide area network (WWAN) operated by a licensed network operator and is further operable on at least one shorter-range, unlicensed wireless network (UWN). The mobile device stores applications that generate data when executed, including at least one application that generates data for communication over the WWAN. The mobile device executes a stored application and classifies data generated by the executed application into one of at least two categories based upon a domain of a target network to which the data is to be sent. A first category relates to data requiring communication at least partially over the WWAN and a second category relates to data not requiring communication over the WWAN. The mobile device establishes communication with a target device in the target network over at least the UWN based upon classification of the data generated by the executed application.

23 Claims, 8 Drawing Sheets

(56) References Cited

U.S. PATENT DOCUMENTS

| | | | |
|---|---|---|---|
| 2005/0186948 A1* | 8/2005 | Gallagher et al. | 455/414.1 |
| 2005/0265279 A1* | 12/2005 | Markovic et al. | 370/328 |
| 2005/0272449 A1* | 12/2005 | Gallagher et al. | 455/458 |
| 2006/0172722 A1* | 8/2006 | Christensen et al. | 455/410 |
| 2006/0198347 A1* | 9/2006 | Hurtta et al. | 370/338 |
| 2006/0265504 A1* | 11/2006 | Taaghol et al. | 709/227 |
| 2007/0053329 A1* | 3/2007 | Brenes et al. | 370/338 |
| 2007/0238448 A1* | 10/2007 | Gallagher et al. | 455/414.2 |
| 2007/0242672 A1* | 10/2007 | Grayson et al. | 370/392 |
| 2008/0281908 A1* | 11/2008 | McCanne et al. | 709/203 |

OTHER PUBLICATIONS http://www.cites.uiuc.edu/vpn/splittunneling.html; Cites : VPN: Split Tunneling; pp. 1-4.

Patent Cooperation Treaty, "Notification of Transmittal of the International Search Report and the Written Opinion of the International Searching Authority" for International Appln. No. PCT/US2009/043877, Sep. 24, 2009, pp. 1-13.

Thomas W. Shinder, "Remote Access VPN and a Twist on the Dangers of Split Tunneling", May 10, 2005, pp. 1-7, http://www.isaserver.org/tutorials/2004fixipsectunnel.html.

Campus Information Technologies and Educational Services (CITES) at University of Illinois at Urbana-Champaign, "Split Tunneling", Oct. 17, 2007, pp. 1-4, http://www.cites.illinois.edu/vpnarchive/splittunneling.html.

International Search Report and Written Opinion dated Sep. 24, 2009 issued by the European Patent Office as International Searching Authority in connection with International Application No. PCT/US2009/043877 (10 pages).

Federal Service on Intellectual Property, "Decision on Grant, A Patent for Invention" for Russian Patent Application No. 201015979/07(075149), Nov. 30, 2012, 8 pages.

* cited by examiner

MOBILE DEVICE AND METHOD FOR INTELLIGENTLY COMMUNICATING DATA GENERATED THEREBY OVER SHORT-RANGE, UNLICENSED WIRELESS NETWORKS AND WIDE AREA WIRELESS NETWORKS

FIELD OF THE INVENTION

The present invention relates generally to wireless communication networks and, more particularly, to a mobile device provisionable for service on a wireless wide area network (e.g., a cellular network) and further operable on one or more short-range, unlicensed wireless networks and a method for intelligently communicating data generated by the mobile device over such networks.

BACKGROUND

In today's wireless age, consumers can have subscriptions simultaneously to multiple communication networks, such as wireless wide area networks (WWANs), wireless metropolitan area networks (WMANs), wireless local area networks (WLANs), and wireless personal area networks (WPANs) for purposes of using voice, video, and/or data services. For example, voice, video or data messaging calls can be communicated over licensed WWANs using protocols and air interfaces developed specifically for those networks (e.g., Global System for Mobile Communications (GSM), General Packet Radio Service (GPRS), Universal Mobile Telecommunications System (UMTS), or Code Division Multiple Access (CDMA)). Alternatively, voice, video or data messaging calls can be communicated over shorter-range wireless networks, such as networks implementing any of the Wi-Fi (IEEE 802.11 a/b/g), WiMax (IEEE 802.16), or Bluetooth protocols.

More recently, unlicensed mobile access (UMA) standards have been developed to define a cellular-over-IP (CoIP) protocol that enables mobile devices (e.g. CoIP handsets) provisioned on WWANs, such as GSM/GPRS, CDMA, UMTS, or other cellular-type networks, to access voice, video, and data messaging services over shorter-range, unlicensed wireless networks (e.g., networks such as Wi-Fi and WiMax that do not require operation by licensed operators using specifically assigned or licensed frequencies). Under such standards, the CoIP handset is a multi-mode device that not only includes appropriate functionality to access a licensed WWAN, but also includes appropriate functionality to access one or more shorter-range, unlicensed wireless networks. Thus, when a CoIP handset detects that it is within range of an unlicensed wireless network, the CoIP handset may select the unlicensed network as its preferred mode of communication because such network generally facilitates higher data rates than does its wide area counterpart and has lower effective airtime costs.

However, one drawback with current UMA standards is that the data (e.g., voice-over-IP (VoIP), text, or video) communicated from the CoIP handset must be routed through the WWAN on which the handset is provisioned. Such routing is generally implemented using the IPsec suite of protocols to tunnel data securely from the CoIP handset to a virtual private network (VPN) server through the WWAN. Because the maximum data rate of the licensed WWAN is typically much less than the maximum data rate of the unlicensed network, the licensed network becomes a bottleneck for the transfer of digital information by users provisioned on the WWAN, but using unlicensed networks for CoIP sessions.

FIG. 8 illustrates an exemplary prior art CoIP architecture. As shown in FIG. 8, the architecture includes a shorter-range, unlicensed wireless network (e.g., a personal home network), an Internet service provider (ISP) network, a mobile virtual network operator (M(V)NO) network, and a mobile network operator (MNO) network providing access to an MNO services network 818 (e.g., voice mail, email, corporate intranets) and a public IP services network 820 (e.g., the Internet). The unlicensed network includes a wireless access point/router 804, such as an integrated access point and digital subscriber line (DSL) or cable modem/router, to receive wireless communications from wireless devices within a coverage range of the access point 804. The ISP network includes appropriate broadband cabling 814 (e.g., DSL or cable) and a broadband IP router 806 or gateway. The M(V)NO network includes a specialized UMA network controller (UNC) 808, which provides a bridge between the ISP network and the MNO network. The interface 816 between the UNC 808 and the WWAN 810 is typically an interface having T1/E1 capacity (e.g., 2 Megabits per second (Mbps)) and must be shared by all CoIP handsets accessing the WWAN 810. The interface 816 is also typically secure to prevent unauthorized access to the WWAN 810. The WWAN 810 is coupled to the MNO services network 818 and the public IP services network 820.

In operation, the CoIP handset 802 is provisioned on the WWAN 810, which is operated by the licensed MNO. The CoIP handset 802 also includes appropriate functionality to communicate data to a target device (e.g., server) in the public IP services network 820 or the NIO services network 818 by transmitting the information over an unlicensed wireless link 812 to an access point/router 804. However, the communication and security protocols running on the CoIP handset 802 require that all transferred data pass through the WWAN 810. Therefore, a user wanting to access corporate email through the MNO services network 818 while attached to the user's unlicensed, home network via CoIP would have to use the WWAN 810, which is not designed to handle heavy volumes of data traffic. Additionally, the interface 816 between the UNC 808 and the WWAN 810 is typically limited to a much lower bandwidth than is the ISP network and further must be shared by many users. For example, when using GPRS as the WWAN, the interface 816 between the UNC 808 and the WWAN 810 is referred to as a "Gb interface" and is typically limited to an E1/T1 capacity of 2 Mbps. However, the Gb interface must be shared by multiple users in multiple cells of the WWAN 810 resulting in traffic entering the UNC 808 from the ISP network at a rate as high as 30 Mbps. Such a mismatch in effective bandwidth between the ISP's broadband IP network and the WWAN 810 produces a data bottleneck.

Other data processing factors further exacerbate the bottleneck at the UNC/WWAN interface 816. For example, such interface 816 is also the location at which broadband IP bearers converge to the WWAN protocols. Additionally, data entering the WWAN 810 is typically characterized by multiple levels of IP traffic tunneling. For instance, the present CoIP handset protocol stack for accessing data service has at least three IP layers (IP layer, Remote IP-IPSec layer, and Transport IP layer). Hence, application traffic is transported through a hierarchy of tunnels, thereby substantially increasing bandwidth. Further, de-tunneling and re-tunneling the traffic at various intermediate nodes adds undesirable processing overhead and latency.

In an attempt to reduce some of the data traffic through the WWAN 810, IPsec-based virtual private networks (VPNs) are known to use a technique referred to as "split tunneling." Split tunneling provides that certain traffic associated with particular destinations is sent directly to the destinations without tunneling, while other traffic is sent to various destinations through a VPN tunnel and a VPN server. For example, split tunneling enables a VPN client to securely transmit data across the Internet to a VPN server (e.g., on a corporate intranet), while allowing non-tunneled access to local devices, such as printers, copiers, and computers. Split tunneling is implemented primarily to differentiate data traffic intended for VPN use from data traffic intended to remain on a local intranet or home network. Split tunneling can be turned off or on depending on the configuration of the VPN client.

When split tunneling is turned on, a user can remotely access a corporate intranet through secure VPN communications, while retaining non-secure access to his or her local home network (e.g., home network printers, computers, routers, and so forth). However, split tunneling may cause erroneous behavior within certain networks resulting in misdirection of traffic destined for VPN servers. The undesirable behavior can be caused by erroneous domain name system (DNS) lookups and conflicting networking topologies. Additionally, split tunneling often requires specific address settings and may be negatively affected by networks that utilize Network Address Translation (NAT).

Furthermore, the split tunneling feature of IPsec-based VPNs can route traffic only to a local network in a private domain (e.g., home network), but cannot route traffic to multiple networks in separate public domains. For example, when using split tunneling as implemented today, a user could print non-tunneled data on a printer on his or her home network, while being connected through a VPN tunnel to an enterprise network. However, split tunneling does not allow direct access to a network outside the home network without traversing the tunneled enterprise network.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
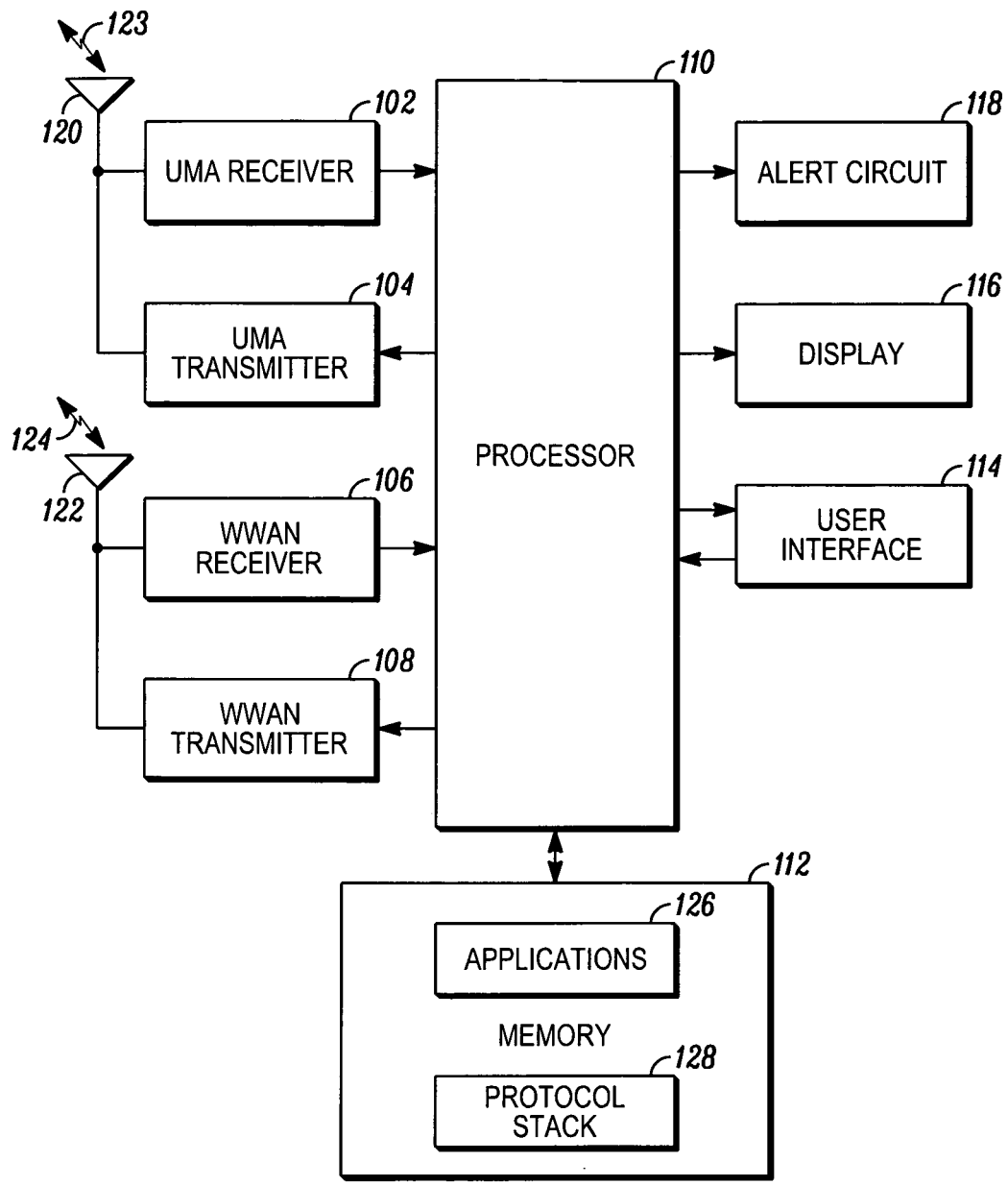
FIG. 1 is an electrical block diagram of a mobile device in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve the understanding of the various embodiments of the present invention.

DETAILED DESCRIPTION

Generally, the present invention encompasses a mobile device and a method for intelligently communicating data generated thereby over a shorter-range unlicensed wireless network (UWN) and a wireless wide area network (WWAN). The mobile device is provisionable for service on a WWAN operated by a licensed network operator and is further operable on at least one shorter-range UWN. The mobile device stores various applications that generate data when executed, including at least one application that generates data for communication over the WWAN.

Some time after storage of the applications, the mobile device executes one or more of the stored applications and classifies data generated by the executed application into one of at least two categories based upon a domain of a target network to which the data is to be sent. The domain of the target network may be determined in any one or more of a variety of ways, including, but not limited to, analyzing an identifier (e.g., IP address or any other address or addresses associated with the routing and/or session management protocols being used, such as TCP, UDP, and so forth) of a target device to which the data is to be sent, analyzing an identifier of the target network to which the data is to be sent (e.g., submask identifier or realm part of a network access identifier, which may be in the form of "userpart@realmpart" where the realm part identifies the target network), analyzing an identifier associated with a service offered in the target network (e.g., type-of-service field within IP address or any identifiers that are part of the routing and/or session management protocols being used), and/or analyzing characteristics of the executed application (e.g., application type). One of the available categories relates to data requiring communication at least partially over the WWAN and another one of the categories relates to data not requiring communication over the WWAN (e.g., data intended for a website in a public IP services network).

After the data has been appropriately classified, the mobile device establishes communication with a target device in the target network over at least the shorter-range UWN based upon the data classification. For example, in one embodiment of the present invention, the mobile device establishes communication with the target device over the shorter-range UWN and the WWAN when the data generated by the executed application is classified in the category relating to data generated for communication over the WWAN (e.g., intended for a target device, such as a server, in a services network of the WWAN's licensed operator). Alternatively, the mobile device establishes communication with the target device over the shorter-range UWN, but not the WWAN, when the data generated by the executed application is classified in the category relating to data not requiring communication over the WWAN (e.g., intended for a target device, such as a server, on the Internet).

By operating a mobile device in this manner, data generated by the mobile device is routed over the WWAN only when the data is generated in connection with applications utilizing services supplied by the WWAN network operator. Such selective routing over the WWAN thereby enables data generated in connection with other applications to avoid the bottleneck that commonly occurs at the interface between an Internet service provider (ISP) and a mobile network operator (MNO) network due to the substantial difference in bandwidth between the broadband ISP network to which the UWN is connected and the much narrower band WWAN contained in the MNO network. In contrast to existing cellular-over-IP (CoIP) solutions which require all data sent over a UWN to be tunneled and further sent over a WWAN on which the mobile device is provisioned, the present invention intelligently selects which data to send over the WWAN and which data to bypass the WWAN to eliminate or mitigate the effect of the ISP network-to-MNO network bottleneck on data not requiring access to the WWAN.

Embodiments of the present invention can be more readily understood with reference to FIGS. 1-7, in which like reference numerals designate like items. FIG. 1 is an electrical block diagram of a mobile device 100 in accordance with an exemplary embodiment of the present invention. The mobile device 100 includes a UMA receiver 102 or other receiver for receiving signals over an unlicensed wireless network (UWN), a UMA transmitter 104 or other transmitter for transmitting signals over a UWN, a WWAN receiver 106, a WWAN transmitter 108, a processor 110, a memory 112, a UWN antenna 120, and a WWAN antenna 122. The mobile device 100 may optionally include, inter alia, a user interface 114, a display 116, and an alert circuit 118.

The UMA receiver 102 and the UMA transmitter 104 are generally well-known and are operational to communicate information signals over unlicensed frequencies used to convey data according to shorter-range wireless protocols, such as Wi-Fi, WiMax, Bluetooth, or Ultra Wide-Band (e.g., IEEE 802.15.4a draft standard). The UMA receiver 102 and the UMA transmitter 104 may be integrated into a single UMA transceiver or modem, or may remain separate as illustrated in FIG. 1.

Similarly, the WWAN receiver 106 and the WWAN transmitter 108 are well-known and are operational to communicate information signals over the particular WWAN on which they are designed to operate. The WWAN receiver 106 and the WWAN transmitter 108 may be integrated into a single WWAN transceiver or modem, or may remain separate as illustrated in FIG. 1.

The communications standard or protocol of the WWAN over which the WWAN receiver 106 and the WWAN transmitter 108 communicate may be any conventional protocol or multiple access technique, including, without limitation, Code Division Multiple Access (CDMA), Wideband CDMA, Time Division Multiple Access (TDMA), Global System for Mobile Communications (GSM), Enhanced Data GSM Environment (EDGE), General Packet Radio Service (GPRS), Frequency Division Multiple Access (FDMA), Orthogonal Frequency Division Multiplexing (OFDM), spread spectrum, or any other known or future developed access or link protocol or methodology. Additionally, the WWAN may further utilize text messaging standards, such as, Short Message Service (SMS), Enhanced Messaging Service (EMS), Multimedia Messaging Service (MMS), or any other future developed standard or proprietary data transmission protocol, to communicate textual, graphic and video data between the mobile device 100 and a base station (not shown). The WWAN may further allow for push-to-talk over cellular communications between capable wireless communication devices.

The WWAN can further use any of a variety of networking protocols, such as, for example, User Datagram Protocol (UDP), Transmission Control Protocol/Internet Protocol (TCP/IP), AppleTalk™, Inter-Packet Exchange/Sequential Packet Exchange (IPX/SPX), Network Basic Input Output System (Net BIOS), or any proprietary or non-proprietary protocol, to communicate digital voice, text, graphics, and/or video (collectively, "data"). Additionally, the WWAN can be connected to one or more wide area networks, such as the Internet and/or the public switched telephone network, or a private customer enterprise network (CEN).

The mobile device 100 may be implemented as a mobile telephone, a smart phone, a text messaging device, a handheld computer, a wireless communication card, a personal digital assistant (PDA), a notebook or laptop computer, or any other wireless communication device that has been modified or fabricated to include the functionality of the present invention. A smart phone is a mobile telephone that has additional application processing capabilities. For example, in one embodiment, a smart phone is a combination of 1) a pocket personal computer (PC), handheld PC, palm top PC, or PDA, and 2) a mobile telephone. A wireless communication card, in one embodiment, resides or is insertable within a PC or a laptop computer. The term "communication device" is intended to broadly cover many different types of devices that can receive and/or transmit signals and that can operate in a wireless communication system. For example, and not by way of limitation, a communication device can include any one or a combination of the following: a cellular telephone, a mobile phone, a smart phone, a two-way radio, a two-way pager, a wireless messaging device, a laptop/computer, an automotive gateway, a residential gateway, a personal computer, a server, a PDA, a router, a cordless telephone, a wireless email device, a portable gaming device including a built-in wireless modem, and the like.

The processor 110 is coupled to the UMA receiver 102, the UMA transmitter 104, the WWAN receiver 106, the WWAN transmitter 108, the memory 112, and, when included, the user interface 114, the display 116, and the alert circuit 118. The processor 110 utilizes conventional signal-processing techniques for processing communication signals received over the UWN link 123 or the WWAN link 124 and for processing communication signals intended for transmission over the UWN link 123 or the WWAN link 124. The processor 110 can be a microprocessor, a microcontroller, a digital signal processor (DSP), a state machine, logic circuitry, or any other device or combination of devices that processes information based on operational or programming instructions stored in the memory 112. One of ordinary skill in the art will appreciate that the processor 110 can be implemented using multiple processors as may be required to handle the processing requirements of the present invention and the various other included functions of the mobile device 100. One of ordinary skill in the art will further recognize that when the processor 110 has one or more of its functions performed by a state machine or logic circuitry, the memory containing the corresponding operational instructions can be embedded within the state machine or logic circuitry as opposed to being external to the processor 110.

In accordance with some embodiments of the present invention, the mobile device 100 has one or more addresses or identities assigned thereto to enable the mobile device 100 to identify and process communication signals intended for the communication device 100 and to provide an indicator of source for communication signals transmitted by the mobile device 100. For example, prior to participating in communications over the WWAN link 124, the mobile device 100 is provisioned for operation over a WWAN by the licensed network operator of the WWAN. Such provisioning is well-known in the art and includes, for example, assigning the mobile device 100 a network identifier, such as a telephone number, otherwise configuring the mobile device 100 for operation in the WWAN, and setting up billing processes. Prior to such provisioning, the mobile device 100 is provisionable on any WWAN that operates using the wireless communication protocol for which the WWAN receiver 106 and WWAN transmitter 108 were designed. Upon the mobile device 100 receiving a signal over either the UWN link 123 or the WWAN link 124, the processor 110 decodes an address in the demodulated data of the received signal, compares the decoded address with one or more addresses stored in an address memory component of the overall device memory 112, and, when the received address correlates substantially with an address stored in the address memory component, proceeds to process the remaining portion of the received signal.

To perform the necessary functions of the mobile device 100, the processor 110 is coupled to the memory 112, which can include random access memory (RAM), read-only memory (ROM), FLASH memory, electrically erasable programmable read-only memory (EEPROM), removable memory (e.g., a subscriber identification module (SIM) card), a hard drive, and/or various other forms of memory as are well known in the art. In one embodiment, the memory 112 includes several memory components, including, but not limited to, an address component, an applications component, and a protocol stack component. It will be appreciated by one of ordinary skill in the art that the various memory components can each be a group of separately located memory areas in the overall or aggregate device memory 112 and that that the device memory 112 may include one or more individual memory elements.

As noted above, the address component of the memory 112 stores the address or addresses that uniquely identifies the mobile device 100. For example, the address component can include the device's international mobile subscriber identification (IMSI), international mobile equipment identity (IMEI), telephone number, group identification, IP address, medium access control (MAC) address, and so forth.

The applications component of the memory 112 (also referred to herein as "applications memory" or "applications memory component") stores a plurality of applications 126 to be executed by the processor 110. The stored applications 126 include one or more applications for accessing services on a services network hosted, operated or controlled by a mobile network operator (MNO) that operates or controls the WWAN. Such MNO service applications, which may include, for example, short message service (SMS), WWAN voice service (e.g., voice-over-IP (VoIP) service), multimedia messaging service (MMS), IP multimedia service (IMS), instant message and/or email service, and wireless application protocol (WAP) service, generate data intended for communication over the WWAN when executed by the processor 110. The stored applications 126 also include one or more applications for accessing services on a public IP services network, such as the Internet. Such public IP services applications generate data, when executed by the processor 110, which need not traverse the WWAN.

Figure 2:
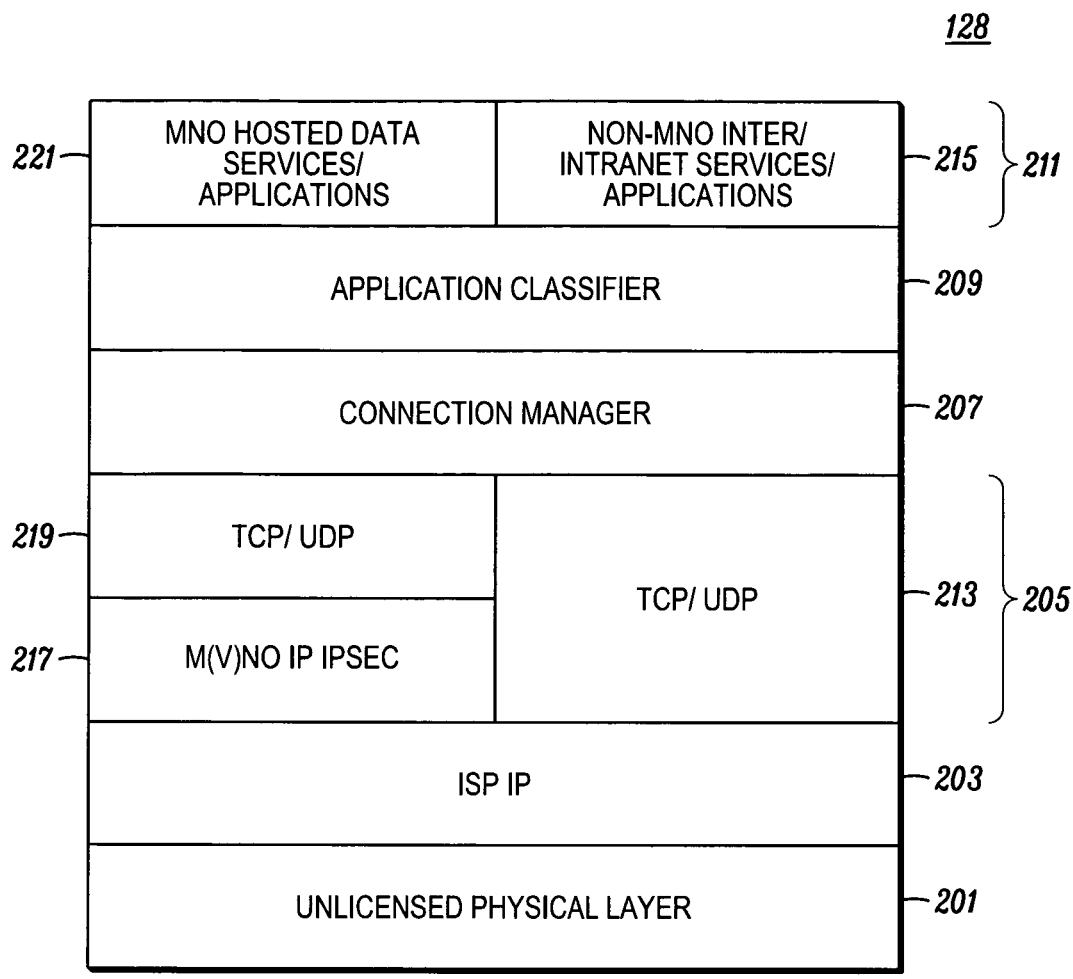
FIG. 2 is a graphical depiction of a communication protocol stack in accordance with an exemplary embodiment of the present invention.

Finally, the protocol stack component of the memory 112 stores a protocol stack 128 for controlling the transfer of data generated by the stored applications 126 either over the UWN and the ISP network alone (e.g., in the case of data generated through execution of public IP services applications) or over the UWN, the ISP network, the WWAN and the NIO network (e.g., in the case of data generated by MNO service applications). FIG. 2 is a graphical depiction of a communication protocol stack 128 for communicating application data over the UWN and selectively over the WWAN in accordance with an exemplary embodiment of the present invention.

When employed, the user interface 114 can comprise, for example, a keypad, a keyboard, a touchpad, a touch screen, a scroll bar or button, a microphone, a speaker, a camera, and/or any other components that enable a user to interact with, operate, and/or supply information to the mobile device 100. The user interface 114 allows the user of the mobile device 100 to input information for use by the mobile device 100 and/or inclusion in at least some of the communication signals transmitted over the UWN link 123 or WWAN link 124.

The optional display 116 can be any now known or future developed display technology, including, without limitation, a liquid crystal display (LCD), a dot matrix display, a plasma display, a light emitting diode LED display, or an organic LED display. The display 116 provides a means by which a user of the mobile device 100 can receive visual indication or notification of mobile device activity and/or view information associated with operating the mobile device 100.

Upon receipt and processing of a communication signal, and storage of a message extracted therefrom, the processor 110 optionally communicates a command signal to the alert circuit 118, when included, as a notification that a wireless communication has been received and stored. The alert circuit 118 can include, for example, a speaker (not shown) with associated speaker drive circuitry capable of playing voice, melodies, and other audible alerts, a vibrator (not shown) with associated vibrator drive circuitry capable of producing a physical vibration, one or more LEDs (not shown) with associated LED drive circuitry capable of producing a visual alert, or a video imaging display capable of producing a visual video alert. It will be appreciated by one of ordinary skill in the art that other similar alerting means as well as any combination of the audible, vibratory, visual, and/or video alert outputs described above can be used to implement the optional alert circuit 118.

As illustrated in FIG. 2, the exemplary protocol stack 128 employed by the mobile device 100 to communicate data (e.g., protocol data units (PDUs)) over the UWN and, selectively, the WWAN includes several protocol layers. The arrangement of the exemplary protocol stack 128 mirrors the conventional arrangement of a protocol stack produced in accordance with the TCP/IP Model. The exemplary protocol stack 128 includes a physical layer 201 that facilitates communication over the UWN wireless link 123, an ISP IP layer 203 that facilitates routing over the ISP's IP network, a transport layer 205 that facilitates end-to-end data transfer and implements error control, fragmentation, and flow control, a connection manager layer 207 that directs data to appropriate portions of the transport layer 205 based on data classification into one of two or more categories, an application classifier layer 209 that classifies application data into one of the categories, and an application layer 211 that runs the particular application and generates the application data. Although not shown expressly in FIG. 2, the physical layer 201 or the ISP IP layer 203 may incorporate a data link layer to facilitate communication over the UWN. For example, the data link layer may implement the data link protocol of IEEE 802.11a/ b/g, IEEE 802.16, Bluetooth, or Ultra Wide-Band. The protocol stack 128 illustrates the ordered operation of various firmware, middleware and software elements during execution, by the mobile device processor 110, of an application that generates data intended for transmission over at least the UWN link 123.

In contrast to the conventional TCP/IP model stack, the protocol stack 128 depicted in FIG. 2 includes the addition of the application classifier layer 209 and the connection manager layer 207, as well as a logical bifurcation or division of the transport layer 205. The application classifier layer 209 classifies data received from the application layer 211 into categories based on a domain of the target network to which the data is to be sent. In one embodiment, the application classifier layer 209 classifies data requiring communication at least partially over the WWAN (e.g., IMS data, MMS data, SMS data, WAP data, and any other data destined for an MNO-hosted server) into a first category and data not requiring communication over the WWAN (e.g., public Internet traffic or any other data not destined for an MNO-hosted server) into a second category. Based on the exemplary application layer 211 depicted in FIG. 2, execution of MNO data services applications 221 would produce the first category of data and execution of non-MNO data services applications 215 would produce the second category of data. Data classification can be configured to occur in real time during execution of an application 126. For example, the application classifier layer 209 can be configured to evaluate the data on a packet-by-packet basis. Alternatively, data can be classified on a per application basis at application start-up or on a session-by-session basis.

Determination of the target network domain to which the application data is to be sent may be made in a variety of ways. For example, the target network domain may be determined based on an identifier of a target device. Exemplary target device identifiers include, but are not limited to, IP address (e.g., 32-bit address for IPv4 or 128-bit IP address of IPv6); MAC address, serial number; IMSI or IMEI (for wireless devices); host identifier; uniform resource locator (URL); or uniform resource identifier (URI) of a server, a mobile device, a personal computer, a PDA, an access point, or any other device to which the application data is to be sent. Alternatively, the target network domain may be determined based on an identifier associated with the target network, such as, for example, a network ID, a subnet mask, or a subnet identifier in the target device's IP address or the IP address from which data was received during execution of an application; realm part of a network access identifier (NAI); and/or an access point identifier (e.g., access point name). Further, the target network domain may be determined based on an identifier associated with discovering a target service for which the data is intended (e.g., a web services URI). Still further, the target network domain may be determined based on characteristics of the executed application. Exemplary application characteristics include, but are not limited to, the type of application (e.g., real time or non-real time); parameters, such as traversal path, that identify the application as being hosted on the MNO network; and/or interactive or very large file download).

The connection manager layer 207 targets different domains (e.g., DNS and/or network attached storage (NAS) devices) for service discovery, sets up IP connections with target servers or devices, and directs or routes the data produced by the application layer 211 to either transmission control protocol/user datagram protocol (TCP/UDP) layer 219 or TCP/UDP layer 213 based upon the classification of the data. For example, data classified into the first category and, thereby, intended for communication at least partially over the WWAN and into the MNO network is directed to TCP/UDP layer 219; whereas, data classified into the second category and, thereby, not intended for communication over the WWAN is directed to TCP/UDP layer 213. Data directed to TCP/UDP layer 219 is encrypted using an encryption layer (e.g., layer 217) so as to prepare it for tunneling over the WWAN.

Additionally, in the protocol stack embodiment depicted in FIG. 2, the transport layer 205 of the protocol stack 128 is logically divided into a single TCP/UDP layer 213 and a combination of a TCP/UDP sublayer 219 together with a M(V)NO IP IPsec sublayer 217. Data conveyed through layers 217 and 219 is encrypted, for example, using the IPsec suite of protocols, for tunneling over the WWAN. The direction of data either through layer 213 or through layers 217 and 219 depends on the classification of the data as discussed above.

In accordance with the present invention, the applications 126 stored in the memory 112 and processed by the application layer 211 of the protocol stack 128 include MNO services applications 221 and non-MNO services applications 215 (e.g., public IP services applications). The MNO services applications 221 produce data intended ultimately for the MNO network and the non-MNO services applications 215 produce data not intended for the MNO network (e.g., intended for a public IP network, such as the Internet). In other words, the target network for data generated by the MNO services applications 221 is the MNO network and the target network for data generated by the non-MNO services applications 215 is not the MNO network. As used herein, a "target network" may be the final destination network or an intermediary network to which data generated by an application is to be sent.

Consistent with operation of a protocol stack mirroring the TCP/IP model, each layer of the protocol stack 128 receives requests for its services across the interface from the next higher layer and, in turn, requests services from the next lower layer across another interface. For example, the application layer 211 requests services from the transport layer 205, which, in response, requests services from the ISP IP layer 203. The ISP IP layer 203 then requests transmission services from the physical layer 201. The application classifier layer 209 and the connection manager layer 207 may be implemented as middleware inserted between the application layer 211 and the transport layer 205 to intelligently route data to the appropriate portion of the transport layer 205 in accordance with exemplary embodiments of the present invention.

Figure 3:
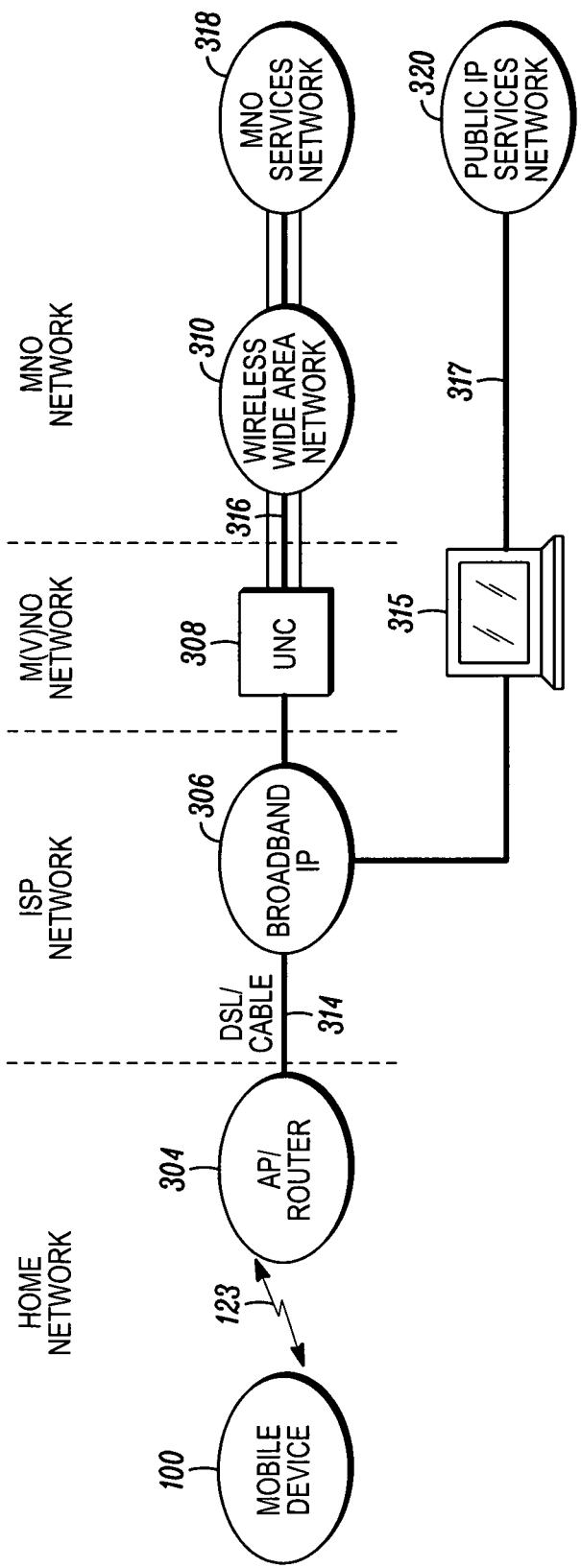
FIG. 3 is a block diagram of an exemplary communication system in which the mobile device of FIG. 1 operates, wherein the communication system includes a wireless wide area network and a shorter-range, unlicensed wireless network.
Figure 4:
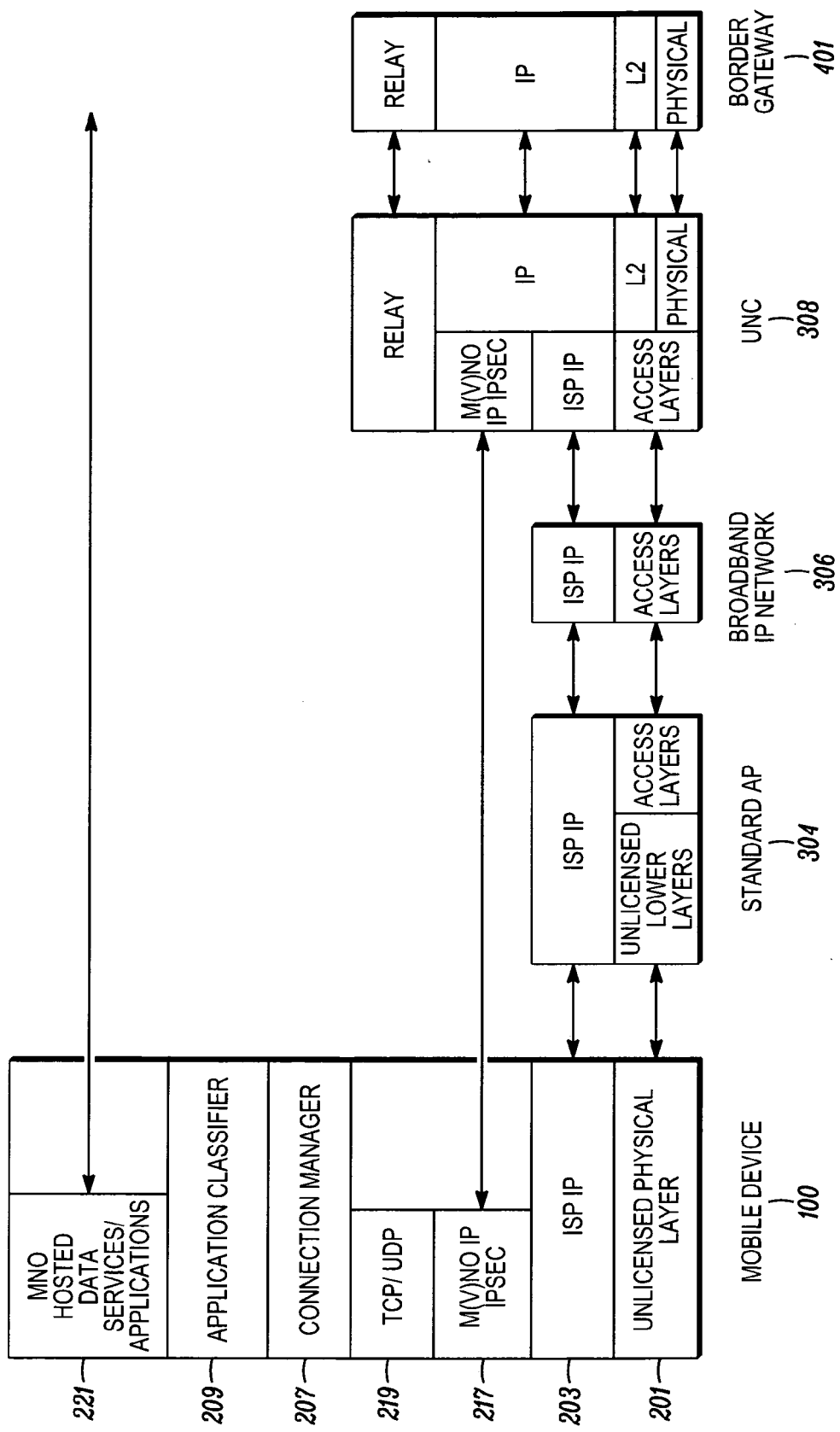
FIG. 4 is a graphical depiction of data protocol communication through various components of the communication system of FIG. 3 during communication of data over both the shorter-range, unlicensed wireless network and the wireless wide area network.

To illustrate the communication of data associated with an MNO-hosted application in accordance with one embodiment of the present invention, reference is made to FIGS. 3 and 4. FIG. 3 is a block diagram of an exemplary communication system 300 in which the mobile device 100 operates. The communication system 300 includes a shorter-range UWN (e.g., a personal home network) coupled to an ISP network, which in turn is coupled to an MNO network (e.g., through an M(V)NO network) and a public IP services network 320 (e.g., through one or more NAS devices 315). The UWN is implemented in FIG. 3 using a wireless access point (AP) 304, which may also include gateway or routing capability as is known in the art. The access point 304 is coupled to the ISP's broadband IP routing network 306 through appropriate cabling 314 and other infrastructure components, such as repeaters. The broadband IP routing network 306 is coupled to the NAS device(s) 315 for the public IP services network 320. The broadband IP routing network 306 is also coupled to the M(V)NO network. In the embodiment shown in FIG. 3, the M(V)NO network includes a UMA controller (UNC) 308, which serves as to translate the transmission protocol of the broadband IP routing network 306 to the wireless transmission protocol of the interface 316 to the MNO network. The MNO network includes, inter alia, a WWAN 310 and an MNO services network 318.

When the mobile device processor 110 executes an application 126 stored in the memory 112 of the mobile device 100 (e.g., in response to user input via the user interface 114), the application layer 211 of the protocol stack 128 produces data (e.g., protocol data units (PDUs)) specific to the executed application 126. The data is supplied to the application classifier layer 209, which intelligently classifies the data into an appropriate category as detailed above. In the example illustrated in FIGS. 3 and 4, the mobile device 100, through its processor 110, executes an application 221 for MNO-hosted data services. As a result, the application classifier layer 209 of the protocol stack 128 classifies the data into the category indicating that the data will require communication at least partially over the WWAN 310.

Based on such classification, the connection manager layer 207 establishes a data session or other communication between the mobile device 100 and a target device on the MNO services network 318, and directs or routes the data produced by the application 221 to the TCP/UDP sublayer 219. After applying appropriate TCP/UDP encapsulation, the data is encrypted by the IPsec sublayer 217 to facilitate virtual private network (VPN) tunneling to the target device over the WWAN 310 via the UNC 308. The encrypted data is then passed to the ISP IP layer 203 for IP encapsulation. The IP-encapsulated data is provided to the physical layer 201 for configuration into a wireless signal for transmission over the UWN wireless link 123. Therefore, in accordance with this embodiment of the present invention, the connection manager layer 207 establishes an IP or other data communication between the mobile device 100 and a target device on the MNO services network 318 over the shorter-range UWN and the WWAN 310 (e.g., GPRS) through the UNC 308 (e.g., a wireless application gateway (WAG)).

After the communication session has been established between the mobile device 100 and the target device on the MNO services network 318, data is communicated by the mobile device 100 over the UWN wireless link 123 to the access point 304 and then through the cabling 314 to the broadband IP routing network 306. The broadband IP routing network 306 passes the data to the UNC 308, where it is tunneled through the WWAN interface 316 to the WWAN 310 and terminates in the domain of the MNO services network 318.

FIG. 4 illustrates data protocol communication through various components of the communication system 300 of FIG. 3 during communication of data over the UWN and the WWAN 310 when the mobile device 100 is currently wirelessly connected to the UWN, not the WWAN 310. As illustrated in FIG. 4, the various layers of the mobile device's protocol stack 128 communicate with corresponding layers of the protocol stacks in the other system devices. For example, the physical layer 201 of the mobile device 100, which is operating in accordance with a UWN wireless link protocol, interfaces and interacts with a corresponding physical layer of the access point 304. Similarly, the IP layer 203 of the mobile device 100 communicates and interacts with the IP layer of the access point 304. The access point 304 converts or translates the UWN physical layer to appropriate physical access layers (e.g., digital subscriber line (DSL), cable, satellite, Ethernet, and so on) for transmitting data between the access point 304 and the broadband IP routing network 306.

After the conversion, the access point's outgoing physical layers interface and interact with corresponding physical access layers of the broadband IP routing network 306. Similarly, the IP layer of the access point 304 communicates and interacts with the IP layer of the broadband IP routing network 306.

The physical access and IP layers of the broadband IP routing network 306 interface and interact with corresponding physical and IP layers of the UNC 308. Additionally, the encryption (Ipsec) sublayer 217 of the mobile device's protocol stack 128 interfaces and interacts with a corresponding layer in the UNC 308. Similar to the access point 304, the UNC 308 converts or translates the physical access layers used to communicate with the broadband IP routing network 306 to appropriate physical and link layers (e.g., Ethernet, E1/T1 lines, etc.) for transmitting data between the UNC 308 and a border gateway 401 of the WWAN 310. After the conversion, the UNC's outgoing physical and link layers interface and interact with corresponding physical and link layers of the border gateway 401. Similarly, IP and frame relay layers of the UNC 308 communicate and interact with peer IP and frame relay layers of the border gateway 401. Once lower layer communication has been established between the mobile device 100 and the target device (not shown) in the MNO services network 318 through the WWAN 310 (as represented by border gateway 401), the MNO services application 221 running in the application layer 211 of the mobile device's protocol stack 128 communicates with the corresponding application layer of the target device in the MNO services network 318. Therefore, communication of data intended for termination in the domain of the MNO services network 318 through both the UWN and the WWAN is successfully accomplished in accordance with the present invention.

Besides facilitating communication between the mobile device 100 and target devices requiring or desiring VPN operation through the WWAN 310 while the mobile device 100 is operating over the UWN, the present invention also facilitates communication between the mobile device 100 and target devices that are not operating through the WWAN 310 by intelligently bypassing the WWAN to establish such communication. To illustrate communication of data associated with a non-MNO-hosted application in accordance with one embodiment of the present invention, reference is made to FIGS. 3 and 5.

When the user of the mobile device 100 activates an application 215 not requiring access to the MNO services network 318 or otherwise requiring VPN tunneling while the mobile device 100 is wirelessly connected to the UWN, the application classifier layer 209 of the protocol stack 128 classifies the data into the category indicating that the data does not require communication wholly or partially over the WWAN 310. Based on such classification, the connection manager layer 207 establishes a data session or other communication between the mobile device 100 and a target device on a network, such as the public IP services network 320, other than the NIO services network 318. The connection manager layer 207 directs or routes the data produced by the application 215 to the TCP/UDP layer 213 of the logically divided transport layer 205. After applying appropriate TCP/UDP encapsulation, the data is passed to the ISP IP layer 203 for IP encapsulation without incorporating the overhead associated with tunneling the data through the WWAN 310. The IP-encapsulated data is provided to the physical layer 201 for configuration into a wireless signal for transmission over the UWN wireless link 123. Therefore, in accordance with this embodiment of the present invention, the connection manager layer 207 establishes an IP or other data communication between the mobile device 100 and a target device outside the MNO services network 318 over the shorter-range UWN, but not the WWAN 310.

After the communication session has been established between the mobile device 100 and the target device on, for example, the public IP services network 320, data is communicated by the mobile device 100 over the UWN wireless link 123 to the access point 304 and then through the cabling 314 to the broadband IP routing network 306. The broadband IP routing network 306 passes the data to the NAS 315, where it is forwarded through the IP services interface 317 and terminates in the domain of the public IP services network 320.

Figure 5:
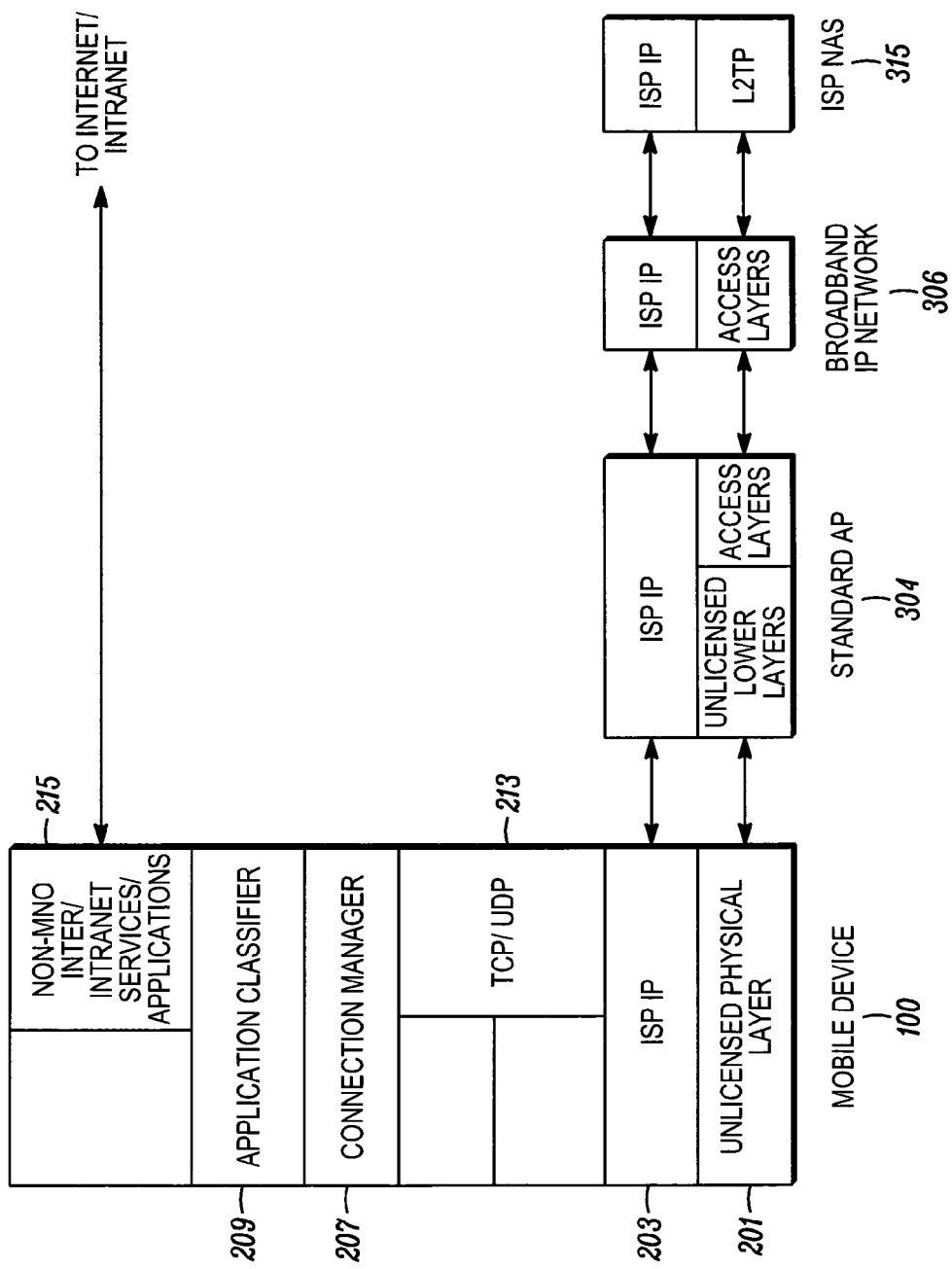
FIG. 5 is a graphical depiction of data protocol communication through various components of the communication system of FIG. 3 during communication of data over the shorter-range, unlicensed wireless network, but not the wireless wide area network.

FIG. 5 illustrates data protocol communication through various components of the communication system 300 of FIG. 3 during communication of data outside of the WWAN 310 when the mobile device 100 is currently wirelessly connected to the UWN. As illustrated in FIG. 5, the various layers of the mobile device's protocol stack 128 communicate with corresponding layers of the protocol stacks in the other system devices. For example, as discussed above with respect to FIG. 4, the physical layer 201 and the IP layer 203 of the mobile device 100 interface and interact with corresponding physical and IP layers of the access point 304. The access point 304 converts or translates the UWN physical layer to appropriate physical access layers for transmitting data between the access point 304 and the broadband IP routing network 306. After the conversion, the access point's outgoing physical layers interface and interact with corresponding physical access layers of the broadband IP routing network 306. Similarly, the IP layer of the access point 304 communicates and interacts with the IP layer of the broadband IP routing network 306.

The physical access and IP layers of the broadband IP routing network 306 interface and interact with corresponding physical and IP layers of the NAS 315. Once lower layer communication has been established between the mobile device 100 and the target device (not shown) in the public IP services network 320 through the NAS 315, the non-MNO services application 215 running in the application layer 211 of the mobile device's protocol stack 128 communicates with the corresponding application layer of the target device in the public IP services network 320. Therefore, communication of data not intended for termination in the domain of the MNO services network 318 is successfully accomplished through the UWN, but not the WWAN 310, in accordance with the present invention. Also, those of ordinary skill in the art will appreciate that the mobile device 100 may execute multiple applications 215, 221 simultaneously with data from each application being appropriately routed through the mobile device's protocol stack 128 and to the respective termination domains based on the classification of the data for each application by the application classifier layer 209.

By adding application classification and connection management functions to the mobile device 100, the present invention substantially improves the overall data transmission efficiency and speed of data communications when the mobile device 100 is operating over the UWN by bypassing the WWAN 310 and the bottleneck typically resulting at the interface 316 between the UNC 308 and the WWAN 310 for all data not requiring access to the WWAN 310. The present invention's intelligent routing/communication functionality makes access to non-MNO data services cheaper, faster, and more convenient in UWN environments by avoiding the typical WWAN bottleneck resulting from the substantial change in data rates between the UWN and the WWAN. For an example, a mobile device in a UWN environment can establish communication with a target device (e.g., another mobile device in another UWN environment) for a VoIP communication without the overhead of encryption and tunneling that might otherwise be required if the VoIP communication were routed through the WWAN. Additionally, the present invention also facilitates improved speed and convenience of communications over the WWAN by eliminating from the WWAN data not intended for target devices in the MNO services network. By reducing the volume of traffic traversing the WWAN and, therefore, the UNC/WWAN interface, the frequency and severity of the UNC/WWAN interface bottleneck may likewise be reduced.

Figure 6:
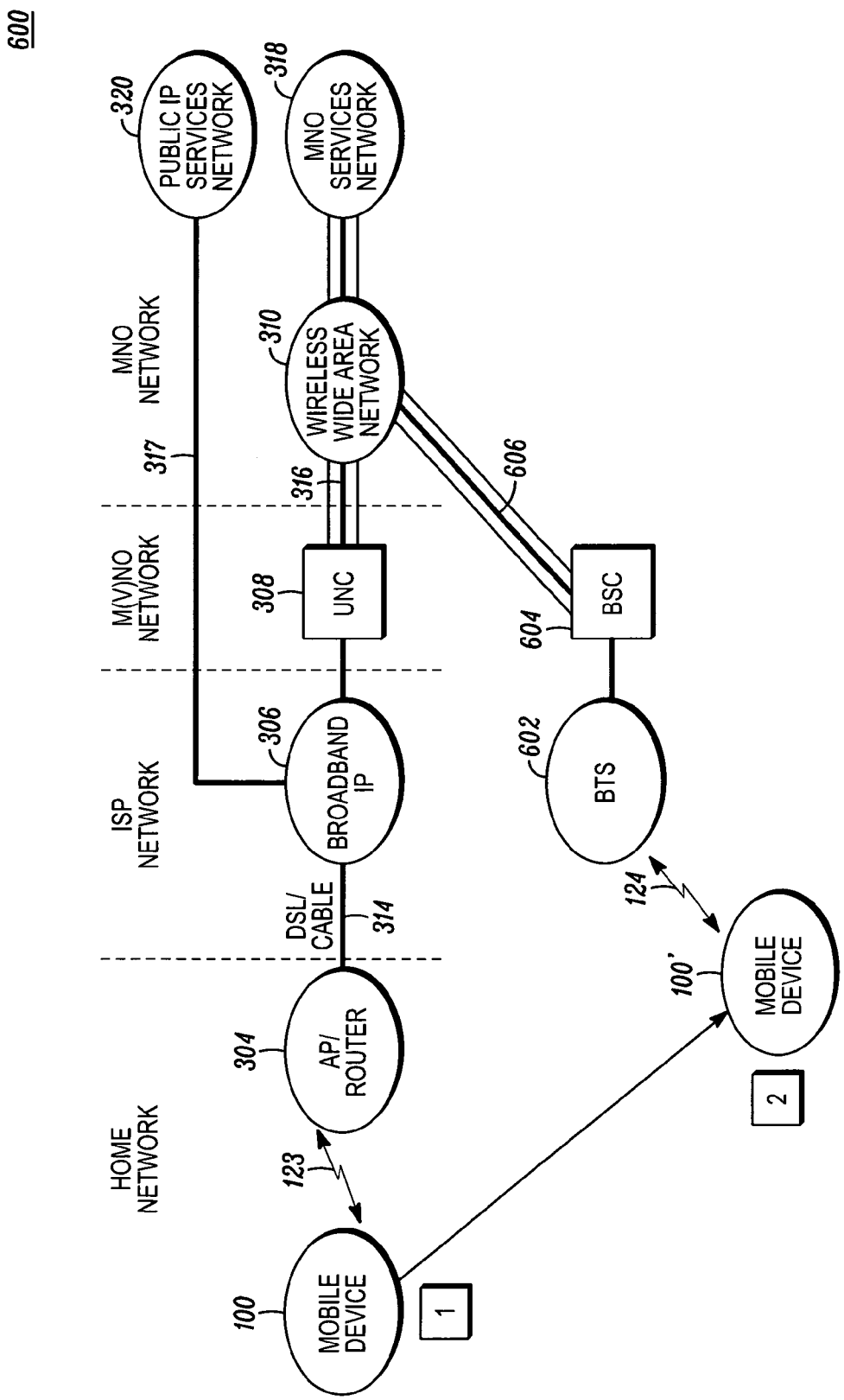
FIG. 6 is a block diagram of another exemplary communication system in which the mobile device of FIG. 1 operates illustrating roaming of the mobile device from a shorter-range, unlicensed wireless network to a wireless wide area network.

Referring now to FIG. 6, the present invention further facilitates seamless IP session continuity when the mobile device 100 establishes an IP data communication session with a target device on the MNO services network 318 via the shorter-range UWN and moves or roams out of the coverage area of the UWN, but remains within the coverage area of the WWAN 310. In this case, the mobile device 100 initially establishes an IP session over the UWN link 123 to the access point 304. Data is then exchanged with the target device as discussed above with respect to FIGS. 3 and 4.

However, as the mobile device 100 moves away from the access point 304 and out of the range of the UWN (e.g., moves from position "1" to position "2" in FIG. 6), the processor 110 or other link quality detection mechanism of the mobile device 100 notices degradation in the signal strength or other link quality characteristic or metric of the UWN link 123. Once the UWN link quality degrades too far to acceptably maintain the data session over the UWN link 123 (e.g., drops below a threshold), the processor 110 initiates a handover from the shorter-range UWN to the WWAN 310, provided that a conventional pre-handover analysis of the WWAN link 124 indicates acceptable signal quality of the WWAN link 124. To accomplish the handover, the mobile device 100 may employ known technologies, such as Mobile IP (as described in Request for Comment (RFC) 3344 (for IPV4) or RFC 3775 (for IPV6) as promulgated by the Internet Engineering Task Force (IETF)), to establish the continued data session over the WWAN link 124.

After the data session has been transferred over to the WWAN link 124, data communicated over the WWAN link 124 is received by a base transceiver station (BTS) 602 of the WWAN 310, which operates under the control of a base station controller (BSC) 604 in accordance with known wireless telecommunications system processing. Because the data is destined for a target device on the MNO services network 213 in this case, the data may be encrypted by the encryption layer 217 of the mobile device's protocol stack 128 to effectively tunnel the data through a VPN established between the mobile device 100 and the target device. The data received by the BTS 602 is communicated to the BSC (e.g., via a T1/E1 link or a microwave link), which in turn supplies it over an interface 606 (e.g., a Gb interface when the WWAN 310 is implemented using GPRS technology) to the remaining portions of the WWAN 310 (e.g. a serving GPRS support node (SGSN)). The WWAN 310 communicates the data to the target device in the MNO services network 318, and vice versa.

Conversely, when the mobile device 100 moves back into the coverage area of shorter-range UWN (e.g., moves back into the coverage area of the access point 304), a handover may be triggered from the WWAN 310 to the shorter-range UWN. In this case, the data connection is transferred or re-established over the UWN link 123 using applicable data session transfer techniques, such as those described in the Mobile IP standards.

Figure 7:
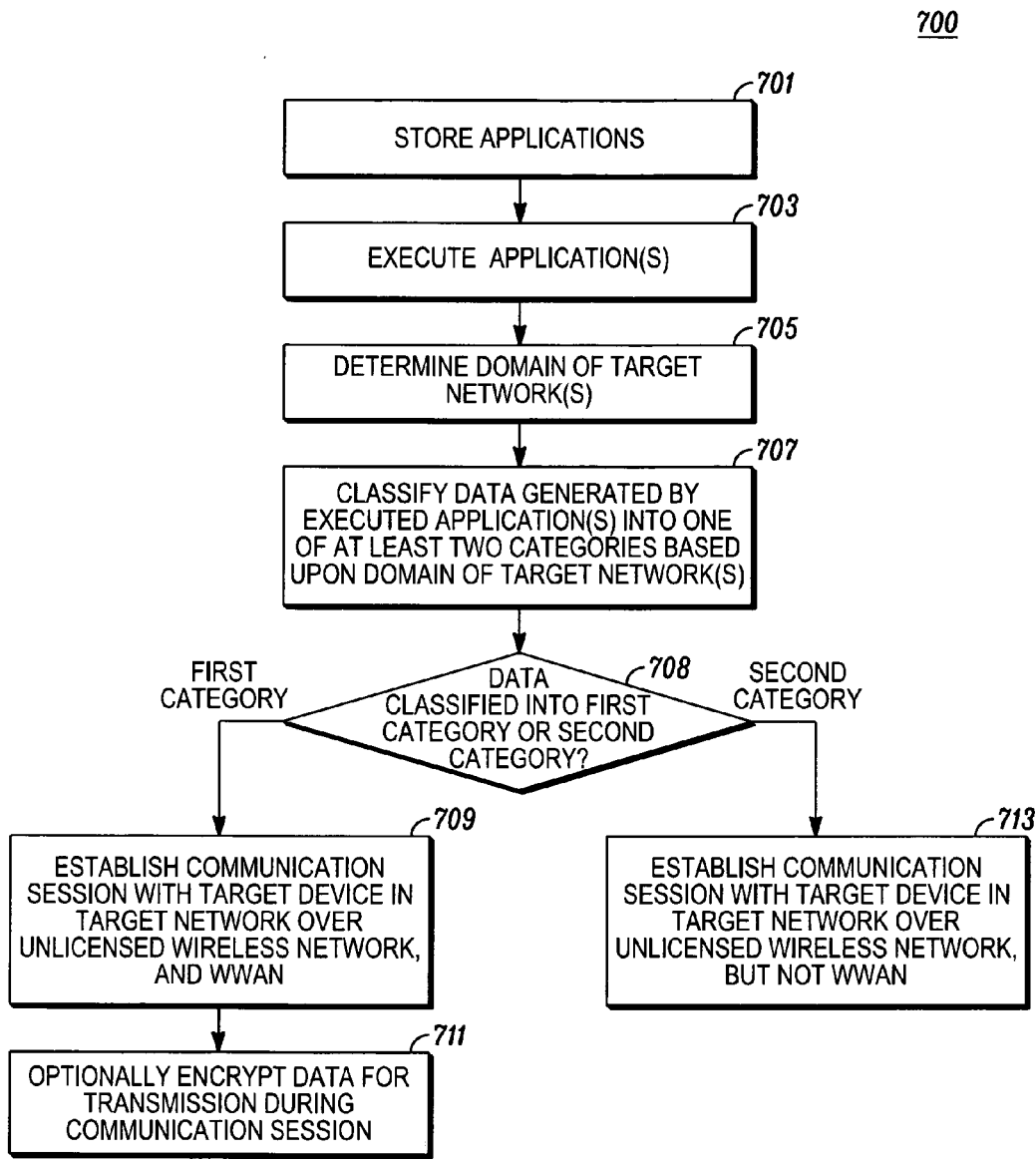
FIG. 7 is an exemplary flow diagram of steps executed by a mobile device to intelligently communicate data over a shorter-range, unlicensed wireless network and a wireless wide area network in accordance with the present invention.
Figure 8:
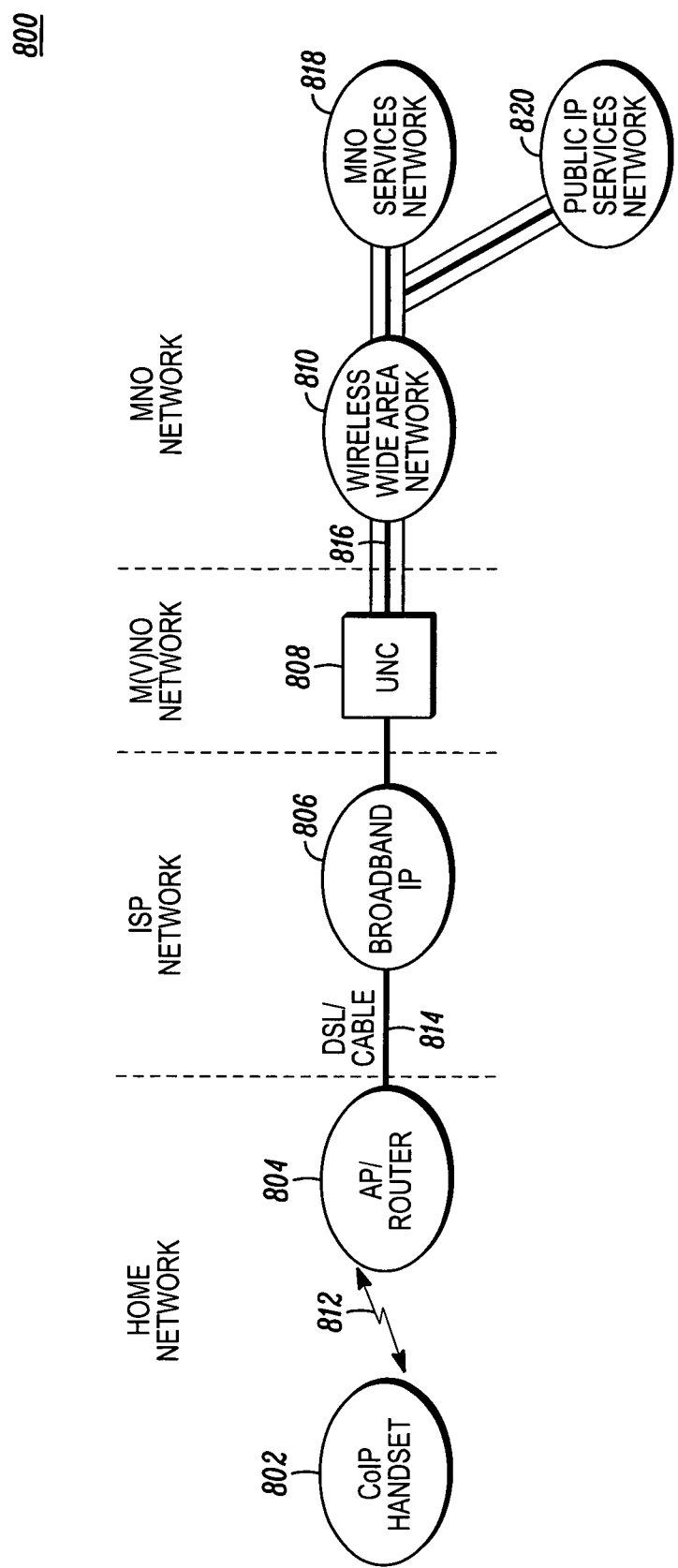
FIG. 8 is a prior art communication system illustrating the communication of data by an existing cellular-over-IP handset over a shorter-range, unlicensed wireless network and a wireless wide area network.

FIG. 7 is an exemplary flow diagram 700 of steps executed by a WWAN-provisionable mobile device to intelligently communicate data over a shorter-range UWN and a WWAN in accordance with the present invention. The steps identified in the logic flow 700 may be executed by the mobile device's processor in accordance with computer programming instructions stored in the mobile device's memory. For example, programming instructions may be stored for implementing the protocol stack 128 discussed above with respect to FIGS. 2-5.

According to the logic flow of FIG. 7, the mobile device stores (701) various applications in its memory, including, but not limited to, applications generating at least some data for communication over a WWAN on which the mobile device has been provisioned. In one embodiment, the stored applications include applications relating to MNO-hosted services, which would require data transfer over the WWAN, as well as applications that do not relate to MNO-hosted services (e.g., browsers and other applications that exchange data with the public IP services network) and, therefore, would not require data transfer over the WWAN.

Some time after storage of the applications, the mobile device connects to the UWN and executes (703) one or more of the stored application(s). For example, the mobile device may utilize the application layer 211 of the protocol stack 128 to execute the application(s). Multiple applications may be executed simultaneously in accordance with known multi-processing techniques. The mobile device then determines (705) the domain of each target network to which data produced by an executed application is to be sent. For example, the mobile device may determine whether the data produced by the particular executed application is intended for communication over the WWAN to the MNO-hosted services network or whether the data is intended for communication outside of the WWAN (e.g., to the public IP services network). Determination of target network domains may be accomplished by examining an identifier associated with a target device on the target network (e.g., IP address, URL, URI, access point name, and/or NAI (e.g., realm part)), an identifier associated with the target network (e.g., network ID or access point name), an identifier associated with discovering a target service (e.g., web services URI), and/or characteristics of the executed application (e.g., application parameters identifying the executed application as being hosted by the licensed MNO, interactive, real time, non-real time, or requiring a very large file download).

Based upon the determined domain of the respective target network, the mobile device classifies (707) the data generated by each executed application into one of at least two categories. One of the categories (e.g., a first category) relates to or includes data requiring communication over the WWAN (e.g., data generated by MNO-hosted services applications) and another one of the categories (e.g., a second category) relates to or includes data not requiring communication over the WWAN (e.g., data generated by non-MNO-hosted services applications). Data classification may be performed in real time, such as on a packet-by-packet basis. Alternatively, data may be classified on a session-by-session basis with all data generated during the particular session presumed to be similarly classified.

Routing of the data is then dependent upon the data classification. For example, for data classified into the first category (708), the mobile device establishes (709) a communication session with a target device in the target network over the UWN to which the mobile device is wirelessly connected and the WWAN on which the mobile device is provisioned. If a VPN or other secure communication is desired with respect to the executed application, the mobile device optionally encrypts (711) the data for transmission during the communication session. Encryption may be performed using any known or future developed encryption method and, in one embodiment, includes encryption using the well-known IPsec suite of protocols.

Continuing the foregoing example, for data classified into the second category (708), the mobile device establishes (713) a communication session with a target device in the target network over the UWN to which the mobile device is wirelessly connected, but not the WWAN on which the mobile device is provisioned. In this case, the data communicated over the UWN to the target device would not include secure information encrypted for tunneling over the WWAN, although it may include encrypted information (e.g., using secure socket layer (SSL) encryption) to facilitate secure e-commerce transactions, for example, over the public IP services network. By communicating data outside the WWAN when access to the WWAN is not necessary, the present invention mitigates the impact of the bottleneck between the ISP IP network and the WWAN on data that does not need to traverse the WWAN. Additionally, the reduction or elimination of public IP services application data and other non-MNO-hosted services application data transferred through the interface between the ISP IP network and the WWAN as a result of the operation of the present invention improves throughput for WWAN-directed data.

As discussed above, multiple separately classified applications may be executed contemporaneously or substantially contemporaneously by the mobile device. In such a case, the processing discussed above with respect to blocks 705-711 is performed for data classified in the first category, while the processing discussed above with respect to blocks 705-708 and 713 is performed for data classified in the second category. The data generated by the contemporaneously running applications may be classified in real time, on a session-by-session basis, or at application start-up by the mobile device.

The present invention encompasses a mobile device and method for intelligently communicating data generated thereby over a shorter-range UWN and a WWAN. With this invention, data generated by applications running on the mobile device is intelligently separated into categories and routed by the mobile device so as to communicate over the WWAN only data requiring communication over such network. Data not requiring communication over the WWAN is communicated over the UWN such that it is not further tunneled or otherwise directed over the WWAN, thereby avoiding and reducing the data bottleneck encountered at the interface between the broadband ISP network and the much narrower-band MNO network.

As detailed above, embodiments of the present invention reside primarily in combinations of method steps and apparatus components related to a mobile device and operation thereof to intelligently communicate data over a UWN and a WWAN. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," and any other variation thereof are intended to cover a non-exclusive inclusion, such that a process, method, article, or apparatus that comprises a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the mobile device described herein may be comprised of one or more conventional processors and unique stored program instructions that control the processor(s) to implement, in conjunction with certain non-processor circuits, some, most, or all of the functions of the mobile device and its operational method as described herein. The non-processor circuits may include, but are not limited to, the receivers 102, 106 and transmitters 104, 108 described above, as well as signal drivers, clock circuits, power source circuits, and user input devices. As such, the functions of these non-processor circuits may be interpreted as steps of a method to intelligently communicate data generated by the mobile device over the UWN and the WWAN. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and ICs with minimal, but not undue, experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for communicating data generated by a mobile device, the mobile device being provisioned for service on a wireless wide area network operated by a licensed network operator and being further operable on at least one shorter-range, unlicensed wireless network, the method comprising:
   storing, by the mobile device, a plurality of applications, each of the plurality of applications generating data when executed and at least one of the plurality of applications being configured to utilize services supplied by the licensed network operator through the wireless wide area network;
   wirelessly connecting, by the mobile device, to a shorter-range, unlicensed wireless network;
   executing, by the mobile device while the mobile device is wirelessly connected to the shorter-range, unlicensed wireless network, at least one of the plurality of applications to produce an executed application;
   classifying, by the mobile device while the mobile device is wirelessly connected to the shorter-range, unlicensed wireless network, data generated by the executed application into one of at least two categories based upon whether the generated data utilizes services supplied by the licensed network operator through the wireless wide area network, the at least two categories including a first category relating to data that utilizes services supplied by the licensed network operator through the wireless wide area network and a second category relating to data that does not utilize services supplied by the licensed network operator through the wireless wide area network;
   establishing, by the mobile device, communication with a target device over the wireless wide area network by way of the shorter-range, unlicensed wireless network when the data generated by the executed application is classified into the first category; and
   establishing, by the mobile device, communication with the target device over the shorter-range, unlicensed wireless network, but not the wireless wide area network, when the data generated by the executed application is classified into the second category.

2. The method of claim 1, further comprising:
   determining, by the mobile device, a domain of a target network servicing the target device based on at least one of an identifier associated with the target device, an identifier associated with the target network, an identifier associated with discovering a target service, and characteristics of the executed application.

3. The method of claim 2, wherein the identifier associated with the target device is at least one of an Internet Protocol address, a uniform resource locator, and a uniform resource identifier, and wherein the identifier associated with the target network is at least one of an access point name and a network access identifier.

4. The method of claim 2, wherein the characteristics of the executed application include parameters identifying the executed application as being hosted by the licensed network operator.

5. The method of claim 1, further comprising:
   encrypting the data generated by the executed application for tunneling over the wireless wide area network when the data generated by the executed application is classified into the first category, but not when the data generated by the executed application is classified into the second category.

6. The method of claim 5, wherein the step of encrypting the data generated by the executed application comprises:
   encrypting the data generated by the executed application using the IPsec suite of protocols.

7. The method of claim 1, wherein the step of classifying occurs in real time during execution of the executed application.

8. The method of claim 1, wherein the step of classifying is performed on a packet-by-packet basis.

9. The method of claim 1, wherein the step of classifying is performed on a session-by-session basis.

10. The method of claim 1, wherein the first category of data includes secure information encrypted for tunneling over the wireless wide area network and the second category of data does not include secure information encrypted for tunneling over the wireless wide area network.

11. The method of claim 1, wherein the communication established with the target device over the wireless wide area network by way of the shorter-range, unlicensed wireless network is a voice-over-IP communication.

12. The method of claim 1, wherein the plurality of applications includes at least a first application and a second application, and wherein the step of executing comprises:
   executing the first application to produce a first executed application, the first executed application generating data utilizing services supplied by the licensed network operator through the wireless wide area network; and
   substantially contemporaneous with execution of the first application, executing the second application to produce a second executed application, the second executed application generating data that does not utilize services supplied by the licensed network operator through the wireless wide area network;
and further wherein the step of classifying comprises:
   classifying data generated by the first executed application into the first category; and
   classifying data generated by the second executed application into the second category.

13. The method of claim 12, wherein the steps of establishing comprise:
   establishing a first communication with a first target device over the wireless wide area network by way of the shorter-range, unlicensed wireless network based upon classification of the data generated by the first executed application into the first category; and
   establishing a second communication with a second target device over at least the shorter-range, unlicensed wireless network, but not the wireless wide area network, based upon classification of the data generated by the second executed application into the second category.

14. The method of claim 13, further comprising:
   determining, by the mobile device, a domain of a first target network servicing the first target device based on at least one of an identifier associated with the first target device, an identifier associated with the first target network, an identifier associated with discovering a first target service, and characteristics of the first executed application; and
   determining, by the mobile device, a domain of a second target network servicing the second target device based on at least one of an identifier associated with the second target device, an identifier associated with the second target network, an identifier associated with discovering a second target service, and characteristics of the second executed application.

15. The method of claim 12, wherein the step of classifying data generated by the first executed application and the step of classifying data generated by the second executed application occur in real time during execution of the first application and the second application.

16. A mobile device provisionable for service on a wireless wide area network operated by a licensed network operator and further operable on at least one shorter-range, unlicensed wireless network, the mobile device comprising:
   a transmitter operable to transmit information over a shorter-range, unlicensed wireless network;
   memory operable to store a plurality of applications, each of the plurality of applications generating data when executed and at least one of the plurality of applications being configured to utilize services supplied by the licensed network operator through the wireless wide area network;
   a processing device operably coupled to the memory and the transmitter, the processing device operable to perform the following functions while the mobile device is wirelessly connected to the shorter-range, unlicensed wireless network:
      execute at least one of the plurality of applications to produce an executed application;
      classify data generated by the executed application into one of at least two categories based upon whether the generated data utilizes services supplied by the licensed network operator through the wireless wide area network, the at least two categories including a first category relating to data that utilizes services supplied by the licensed network operator through the wireless wide area network and a second category relating to data that does not utilize services supplied by the licensed network operator through the wireless wide area network;
      establish communication with a target device over the wireless wide area network by way of the shorter-range, unlicensed wireless network when the data generated by the executed application is classified into the first category; and
      establish communication with the target device over the shorter-range, unlicensed wireless network, but not the wireless wide area network, when the data generated by the executed application is classified into the second category.

17. The mobile device of claim 16, wherein the processing device is further operable to:
   determine a domain of a target network servicing the target device based on at least one of an identifier associated with the target device, an identifier associated with the target network, an identifier associated with discovering a target service, and characteristics of the executed application.

18. The mobile device of claim 17, wherein the identifier associated with the target device is at least one of an Internet Protocol address, a uniform resource locator, a uniform resource identifier, an access point name, and a network access identifier.

19. The mobile device of claim 17, wherein the characteristics of the executed application include parameters identifying the executed application as being hosted by the licensed network operator.

20. The mobile device of claim 16, wherein the processing device is further operable to:
   encrypt the data generated by the executed application for tunneling over the wireless wide area network when the data generated by the executed application is classified into the first category, but not when the data generated by the executed application is classified into the second category.

21. The method of claim 1, further comprising:
   preparing, by the mobile device, the data generated by the executed application for tunneling over the wireless wide area network when the data generated by the executed application is classified into the first category, but not when the data generated by the executed application is classified into the second category.

22. The mobile device of claim 16, wherein:
- the memory further stores a protocol stack for communicating data over at least one of the shorter-range, unlicensed wireless network and the wireless wide area network;
- the protocol stack includes a plurality of protocol layers;
- the plurality of protocol layers includes a transport protocol layer that is logically divided into a first transport protocol layer that includes encryption for tunneling data over the wireless wide area network and a second transport protocol layer that excludes encryption for tunneling data over the wireless wide area network;
- the processing device is operable to process the data generated by the executed application through the first transport protocol layer when the data is classified in the first category; and
- the processing device is operable to process the data generated by the executed application through the second transport protocol layer when the data is classified in the second category.

23. The mobile device of claim 22, wherein the first transport protocol layer includes a transmission control protocol/user datagram protocol (TCP/UDP) sublayer and an encryption sublayer, and wherein the second transport protocol layer is a TCP/UDP layer, but excludes encryption.

* * * * *